United States Patent
Yu et al.

(10) Patent No.: US 10,809,594 B2
(45) Date of Patent: Oct. 20, 2020

(54) KIND OF VISIBLE ULTRAVIOLET BAND OPTICAL FREQUENCY CONVERTER

(71) Applicant: SHANDONG UNIVERSITY, Jinan (CN)

(72) Inventors: Haohai Yu, Jinan (CN); Huaijin Zhang, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 16/843,204

(22) Filed: Apr. 8, 2020

(65) Prior Publication Data

US 2020/0233280 A1 Jul. 23, 2020

Related U.S. Application Data

(63) Continuation of application No. PCT/CN2019/086352, filed on May 10, 2019.

(51) Int. Cl.
*G02F 1/35* (2006.01)
*G02F 1/355* (2006.01)
*G02F 1/37* (2006.01)

(52) U.S. Cl.
CPC .......... *G02F 1/3501* (2013.01); *G02F 1/3544* (2013.01); *G02F 1/3551* (2013.01); *G02F 1/37* (2013.01); *G02F 2001/3503* (2013.01); *G02F 2001/3548* (2013.01)

(58) Field of Classification Search
CPC ........ G02F 1/3501; G02F 1/3551; G02F 1/37; G02F 2001/3503
See application file for complete search history.

(56) References Cited

U.S. PATENT DOCUMENTS

| | | | | |
|---|---|---|---|---|
| 5,986,798 A | * | 11/1999 | Karlsson | C30B 33/00 359/326 |
| 6,711,183 B1 | * | 3/2004 | Mizuuchi | G02F 1/3775 372/108 |
| 6,741,620 B2 | * | 5/2004 | Gerstenberger | G02B 6/124 372/21 |
| 7,016,103 B2 | * | 3/2006 | Paschotta | G02F 1/3532 359/326 |
| 2003/0179439 A1 | * | 9/2003 | Lin | G02F 1/3558 359/326 |
| 2020/0241382 A1 | * | 7/2020 | Zhong | G02F 1/39 |

* cited by examiner

*Primary Examiner* — Daniel Petkovsek
(74) *Attorney, Agent, or Firm* — CBM Patent Consulting, LLC (57) ABSTRACT

A visible-to-ultraviolet band optical frequency converter. The processing period of a nonlinear optical crystal is controlled to provide an additional period phase to meet a phase matching condition so as to realize effective optical frequency conversion. The additional period phase is characterized in that phase gratings periodically arranged according to different refractive indexes are formed in the crystal through technologies, including laser micro-processing, ion etching and the like, a nonlinear frequency conversion inverse process is avoided through the periodic structure damage of the crystals in the phase gratings and an additional period phase is provided, phase mismatch caused by the insufficient double refraction of the nonlinear optical crystal is avoided, and efficient frequency doubling or sum frequency output is realized.

10 Claims, 5 Drawing Sheets

KIND OF VISIBLE ULTRAVIOLET BAND OPTICAL FREQUENCY CONVERTER

This application is a continuation application of International Application No. PCT/CN2019/086352 filed on 10 May 2019 which claims priority to Chinese Application Nos. filed CN201910363871.2 filed on 30 Apr. 2019, the entire contents of each of which are hereby incorporated by reference.

TECHNICAL FIELD

The invention relates to a nonlinear optical crystal device and in particular to a visible-to-ultraviolet band optical frequency converter, and belongs to the field of laser technology.

BACKGROUND ART

Nonlinear optical frequency conversion is to realize frequency up-conversion or down-conversion for light through the nonlinear optical response of the material, wherein the frequency-doubling effect, as one of the most widely studied and applied effects in the nonlinear optical field, is to double the optical frequency and shorten the wavelength by half relying on the frequency up-conversion effect. The frequency-doubling effect uses the nonlinear optical frequency converter as its material basis. In this effect, momentum conservation, namely the phase matching condition, is the basic requirement for efficient optical frequency conversion. Generally, an equal refractive index is to be achieved between the fundamental frequency o light or e light and the frequency doubling e light or o light under a special chamfering angle based on the dispersion relation of the birefringent effect so as to realize phase matching and efficient frequency doubling light output. Currently, visible-to-ultraviolet band lasers are already available based on double refraction and have been applied in many fields related to national economy and national security. However, due to the double-refraction phase matching mode, crystals are required to have appropriate double refraction, which has excluded most of the crystals without appropriate double refraction and limited the availability of efficient lasers, especially the applications of ultraviolet and even deep ultraviolet lasers. Limited by the phase matching condition, only the layered KBBF crystal can achieve the effective frequency doubling of deep ultraviolet. However, the KBBF crystal is too difficult to grow due to its layered structure, and the toxicity of the raw materials used by it has also greatly limited its availability.

DESCRIPTION OF THE INVENTION

In view of the shortcomings of the existing nonlinear optical frequency conversion technologies and nonlinear optical materials, the invention provides a kind of visible-to-ultraviolet band optical frequency converter to realize the frequency-doubling and sum frequency conversion from visible band to ultraviolet and even deep ultraviolet bands.

SUMMARY OF THE INVENTION

The crystal used in the invention is a nonlinear optical crystal. The crystal is to be cut in a certain direction according to the nonlinear coefficient applied, and the surface perpendicular to the cutting direction is to be polished and coated or uncoated. Then, internal uniformity of the crystal is damaged through technologies, including laser processing or ion beam etching and the like, to have the damaged region lose its effective nonlinear effect and fail to realize effective frequency doubling process. Thus, the phase change of fundamental frequency light and frequency doubling (or sum frequency) light can be realized, and the phase difference between the fundamental frequency light and the frequency doubling light can be controlled to regulate the phase of light in the crystal and realize phase matching to obtain effective optical frequency conversion.

Term Explanation o light: indicates a kind of polarized light with vibration direction perpendicular to the principal plane formed by the optical axis of the crystal and the light incidence direction e light: indicates a kind of polarized light with vibration direction parallel to the principal plane formed by the optical axis of the crystal and the light incidence direction Ultraviolet light: indicates a kind of light with a wavelength shorter than 400 nanometers.

Figure 2:
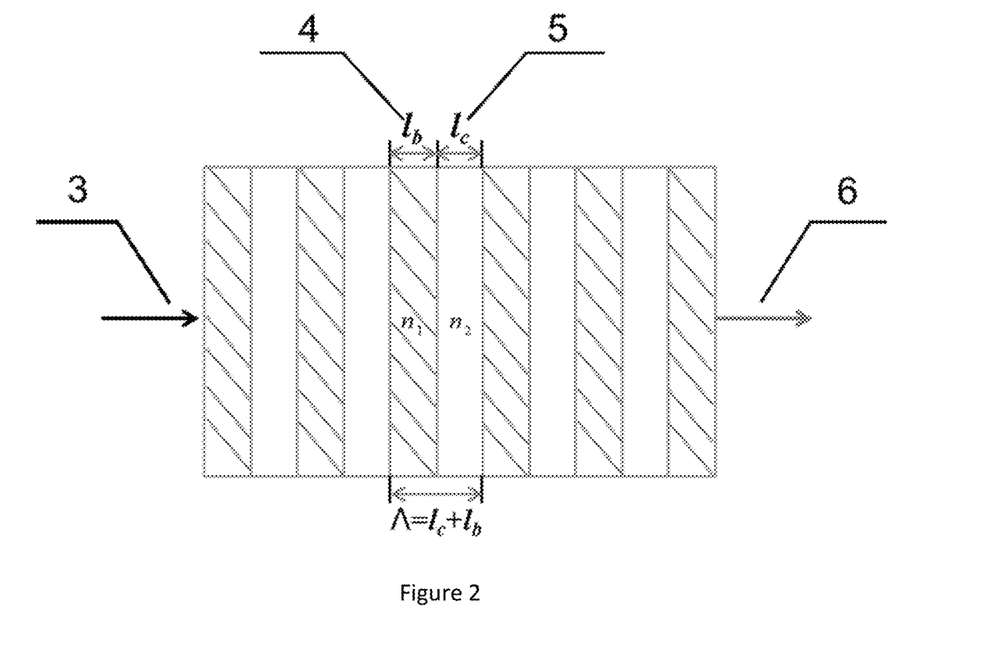
FIG. 2 is the periodical arrangement diagram of refractive indexes of the crystal after lithography, wherein 3 is the pump light, 4 is the unprocessed part of the crystal with refractive index of $n_1$ and width of $l_c$, 5 is the processed part of the crystal with refractive index of $n_2$, width of $l_b$, and grating period of $\Lambda=l_c+l_b$; 6 frequency-doubling output light.

Grating period: namely grating constant. As shown in FIG. 2, the crystal is to be processed through technologies, including laser processing, ion etching and the like, to have gratings periodically arranged according to different refractive indexes formed in the crystal, with a grating period of $\Lambda = l_c + l_b$ (where: $l_c$ is the width of the unprocessed part of the crystal in the light transmission direction; $l_b$ is the width of the processed part of the crystal in the light transmission direction).

The technical solution of the invention is as follows:

A kind of visible-to-ultraviolet band optical frequency converter, which uses a nonlinear optical crystal, characterized in that periodically arranged amorphous regions are formed in the said optical crystal; such amorphous regions cannot realize the coherent superposition of nonlinear optical effects, and will block the conversion process from frequency doubling light to fundamental frequency light, but they can provide the phase difference between the fundamental frequency light and the frequency doubling light.

According to a preferred embodiment of the present invention, the said amorphous regions provide a phase difference between the fundamental frequency light and the frequency doubling light as $\Delta \varphi_b = (2m+1)\pi$ (where: m is an integer).

According to a preferred embodiment of the present invention, the said periodically arranged amorphous regions are phase gratings periodically arranged in a direction perpendicular to the light transmission direction according to different refractive indexes; the said phase gratings are arranged in parallel with the light transmission direction of the crystal; and the phase difference of transmission between the processed region and the un-processed region in each grating period is always $\Delta \varphi_b = (2m+1)\pi$ (where: m is an integer). The periodically arranged gratings in the invention include both processed amorphous regions and unprocessed regions. As refractive indexes of these two parts are different, periodically arranged refractive indexes are formed. Both the two parts can provide a phase difference that is odd times of $\pi$. In the unprocessed part, there is not only phase difference but also effective nonlinear effect, namely the continuous conversion between the fundamental frequency light and the frequency doubling light, while, in the processed regions, there is no effective nonlinear effect but phase difference.

According to a preferred embodiment of the present invention, the said gratings are obtained through processing of the crystal, namely an additional phase period is added; the processing methods include but are not limited to laser micro processing, ion etching and other technologies that can realize the local destruction of the crystal.

In the invention, the structure of the crystal itself is damaged to have periodically arranged amorphous regions formed and to have such regions lose their nonlinear optical effects. The conversion process from frequency doubling light to fundamental frequency light is then blocked in these regions, but such regions can still provide the phase difference between the fundamental frequency light and the frequency doubling light.

According to a further preferred embodiment, the invention makes use of the technologies, including laser processing, ion etching and the like, to have gratings periodically arranged according to different refractive indexes formed in the crystal. The phase difference between the fundamental frequency light and the frequency doubling light (or sum frequency light) is then realized relying on the dispersion relation between the refractive index and the wavelength to meet the phase matching and realize efficient frequency doubling output.

As shown in FIG. 2, the grating period in the invention $\Lambda l_c + l_b$ (where: $l_c$ is the width of the unprocessed part of the crystal in the light transmission direction; $l_b$ is the width of the processed part of the crystal in the light transmission direction). The processing length of the gratings in the light transmission direction is controlled to control the phase of light while being transmitted through the crystal. The phase difference of transmission of the crystal in a grating period can be represented as $\Delta\varphi = \Delta k \cdot \Lambda$ (where: $\Delta k$ is the reciprocal-lattice vector of phase mismatch of the nonlinear optical crystal and $\Lambda$ is the grating period). According to a preferred embodiment, the width of the unprocessed part $l_c$=0.1-50 μm, and the width of the processed part $l_b$=0.1-50 μm.

According to a preferred embodiment of the present invention, the said nonlinear optical crystal can be but is not limited to the following crystals, including $SiO_2$ crystal, LBO crystal, β-BBO crystal, SBO crystal, $LiNbO_3$ crystal, KBBF crystal, KDP crystal, $MgBaF_4$ crystal and the like. The crystal is to be cut in a certain direction according to the nonlinear coefficient applied, and the surface perpendicular to the cutting direction is to be polished. Then, the periodical phase gratings perpendicular to the light transmission direction are processed through technologies, including laser lithography, ion etching and the like, along the light transmission direction. The length of the processed region is to be controlled according to the wavelength of the incident fundamental frequency light wave and the refractive index dispersion equation of the nonlinear optical crystal to provide an additional period phase so as to meet the phase matching condition and realize the frequency conversion from visible band to ultraviolet and deep ultraviolet bands.

According to a preferred embodiment of the present invention, the said nonlinear optical crystal is surface coated with dielectric film that allows high transmission of both fundamental frequency light and frequency doubling light, or is uncoated.

According to a preferred embodiment of the present invention, the said nonlinear optical crystal is 0.1-100 mm long in the light transmission direction, and is further preferred to be 3-10 mm; the cross section of the said nonlinear optical crystal can be round, square or in any other shape.

According to a preferred embodiment of the present invention, the preparation method of the said visible-to-ultraviolet band optical frequency converter includes the steps as follows:

The nonlinear optical crystal is to be cut in a certain direction according to the nonlinear coefficient applied, and gratings periodically arranged according to different refractive indexes are to be formed in the crystal through the technologies, including laser processing or ion etching and the like. The structure of the crystal itself is to be damaged to have periodically arranged amorphous regions formed and to have such regions lose their nonlinear optical effects. The conversion process from frequency doubling light to fundamental frequency light is then blocked in these regions, but such regions can still provide the phase difference between the fundamental frequency light and the frequency doubling light. The phase difference is expressed as $\Delta\varphi_b = (2m+1)\pi$ (where: m is an integer).

As shown in FIG. 2, in the invention, the processing length of the gratings in the light transmission direction is controlled to control the phase of light while being transmitted through the crystal. The phase difference of transmission of the crystal in a grating period can be represented as $\Delta\varphi = \Delta k \cdot \Lambda$ (where: $\Delta k$ is the reciprocal-lattice vector of phase mismatch of the nonlinear optical crystal and $\Lambda$ is the grating period; $\Lambda = l_c + l_b$ (where: $l_c$ is the width of the unprocessed part of the crystal in the light transmission direction; $l_b$ is the width of the processed part of the crystal in the light transmission direction). By changing the processing length of the damaged region, the phase difference between the fundamental frequency light and the frequency doubling light of the damaged region can be made equal to that of the undamaged region, namely $\Delta\varphi_b = \Delta k \cdot l_b$ equals to $\Delta\varphi_c = \Delta k \cdot l_c$ as $(2m+1)\pi$ (where: m is an integer). The additional period phase difference of the damaged region can be controlled as $\Delta\varphi_b = (2m+1)\pi$ so as to meet the phase matching condition and realize effective optical frequency conversion.

According to an embodiment of the invention, the said visible-to-ultraviolet band optical frequency element can be applied in optical frequency converters, and further in visible-to-ultraviolet band optical frequency converters According to an embodiment of the invention, the visible-to-ultraviolet band optical frequency converter can also be applied in lasers that can realize visible-to-ultraviolet band optical frequency conversion.

According to the invention, a kind of visible-to-ultraviolet band frequency conversion laser comprises a pump source, an optical frequency converter, a prism and a detector that are arranged successively along the light path; the said optical frequency converter, prism and detector are arranged in the glove box.

According to an embodiment of the laser of the invention, a focusing system is also provided between the said pump source and the said optical frequency converter.

According to a preferred embodiment of the laser of the invention, the said pump source can be a continuous laser pump source or a pulsed laser pump source; the said prism is a calcium fluoride prism; and the said focusing system is a convex lens.

According to an embodiment of the invention, while the said visible-to-ultraviolet band optical frequency conversion laser is operating, the pump source is to emit a laser, which can enter into the optical frequency converter after being focused by the focusing system. Periodically arranged amorphous regions are provided in the optical crystal of the optical frequency converter. Such amorphous regions have no nonlinear optical effect and thus can block the conversion process from frequency doubling light to fundamental frequency light, but they can provide the phase difference between the fundamental frequency light and the frequency doubling light to remedy the insufficient phase mismatch of the nonlinear optical crystal and realize efficient frequency-doubling and sum frequency conversion. The converted laser then enters the prism to separate the light of different wavelengths for easy observation. The prism can separate the pump light and the frequency doubling light which then enter into the detector for power or energy detection so as to determine whether the optical frequency conversion has been achieved. The optical frequency converter, the prism and the detector are all arranged in the glove box so that the whole process can be completed in a vacuum or nitrogen environment.

Beneficial Effects of the Invention

1. The invention uses a nonlinear optical crystal in which amorphous regions are periodically arranged. Such amorphous regions have no nonlinear optical effect and thus can block the conversion process from frequency doubling light to fundamental frequency light, but they can provide the phase difference between the fundamental frequency light and the frequency doubling light. For example, phase gratings periodically arranged according to different refractive indexes can be formed in the nonlinear optical crystal through technologies, including laser micro-processing, ion etching and the like to provide an additional period phase so as to remedy the insufficient phase mismatch of the nonlinear optical crystal and realize efficient frequency doubling or sum frequency conversion, especially deep ultraviolet laser output. The invention has not only simple construction, but also easy manufacturing steps, and can realize the optical frequency conversion from the visible band to the ultraviolet band successfully.

2. The invention has no special requirements for the structure of the nonlinear optical crystal and can enable all nonlinear optical crystals to be processed to realize the optical frequency conversion from visible band to ultraviolet band within its light transmissivity range.

3. The invention does not need to rely on additional effects, such as effects of electric field and can realize the optical frequency conversion from visible band to ultraviolet band only by having periodical gratings processed in the crystal. The method is very simple, with high processing accuracy and strong controllability.

4. By use of the said phase matching mode of additional period phase in the invention, the nonlinear optical material can be optimized, such as selecting crystals with larger effective nonlinear coefficients or selecting the larger effective nonlinear coefficient of the crystal, so as to improve the efficiency of frequency conversion.

5. The invention can optimize the different wavelengths. The frequency conversion of the corresponding wavelength can be realized just by selecting an appropriate nonlinear crystal according to the required wavelength and providing the additional period phase matching with it through laser lithography and other technologies.

BRIEF DESCRIPTION OF THE DRAWINGS

In order to more clearly describe the embodiments of the invention or the technical solutions in the existing technologies, the drawings required to be used in the embodiments are briefly described as follows. It is obvious that the drawings described below are only some embodiments of the invention, and that other drawings may be obtained from them without any creative labor for those skilled in this field.

DETAILED EMBODIMENTS

The invention is further described in details as follows in combination with the figures attached to the invention and the embodiments, but is not limited to that.

Figure 1:
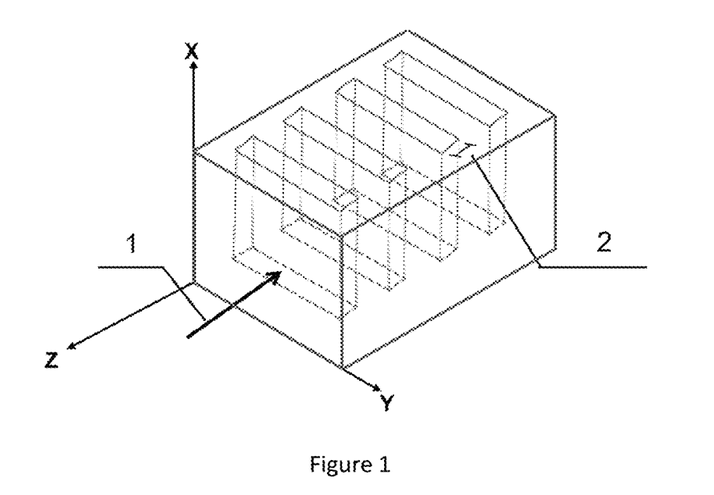
FIG. 1 is the processing diagram of the quartz crystal in Embodiment 1, wherein 1 is the direction of the pump light source, 2 is the processed region, and X, Y and Z are the optical axes of the quartz crystal.

Embodiment 1: Quartz Crystal 177.3 nm-Wavelength Deep Ultraviolet Frequency-Doubling Converter Preparation process of the optical frequency converter: A quartz crystal is to be used as the nonlinear optical crystal, and is to be processed as shown in FIG. 1. With the maximum nonlinear coefficient $d_{11}$, the quartz crystal is to be cut in the Z direction. A grating structure periodically arranged according to different refractive indexes is then formed by laser etching in the Z direction, wherein the lithographic region provides an additional phase period and width of the processed region and the unprocessed region is both 0.7 μm. The processed region can provide an additional period phase difference of π between the fundamental frequency light and the frequency doubling light. The crystal is 1 mm long across the whole processed region with cross section of 3 mm×3 mm, and its surface is polished. The periodical arrangement of the refractive indexes is as shown in FIG. 2.

Figure 3:
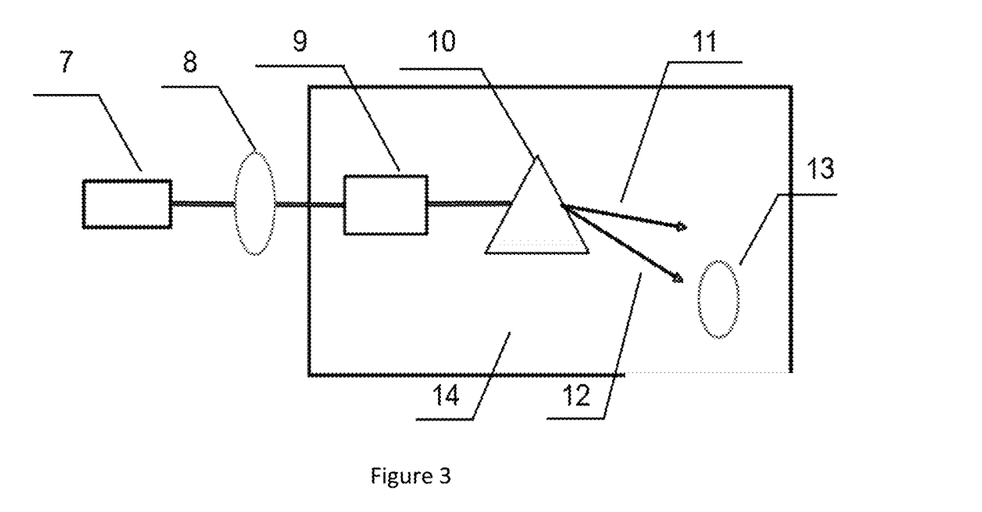
FIG. 3 is the diagram of experimental set-up in Embodiment 1, wherein 7 is the pump source with a wavelength of 355 nm, 8 is the focusing system, 9 is the optical frequency converter, 10 is the calcium fluoride prism that can separate light of different wavelength to facilitate observation, 11 is the pump light, 12 is the frequency doubling light that is separated out by the prism, 13 is the detector that can detect the power and energy, and 14 is the glove box that can provide a vacuum or nitrogen environment.

The experimental facility as shown in FIG. 3 is composed of pump source 7, focusing system 8, optical frequency converter 9, calcium fluoride prism 10 and detector 13 which are arranged in sequence along the optical path. The optical frequency converter 9, prism 10 and detector 13 are all arranged in the glove box 14.

The pump source 7 is an ultraviolet pulsed laser with a wavelength of 355 nm, a pulse width of 6 ns and a repetition frequency of 10 Hz. The focusing system 8 is a focus lens with a focal length of 10 cm. The glove box 14 can provide a vacuum environment by vacuum-pumping or a nitrogen environment by nitrogen filling so as to reduce the absorption loss of deep ultraviolet band in the air. The calcium fluoride prism 10 can separate the pump light and the frequency doubling light waves according to the crystal dispersion equation and the different refractive indexes of the light waves with different wavelengths in the crystal to facilitate the effective output and application of the frequency doubling light.

The laser light emitted by the pump source 7 enters into the optical frequency converter 9 after being focused by the focusing system 8. Periodically arranged amorphous regions are provided in the optical crystal of the optical frequency converter 9. Such amorphous regions have no nonlinear optical effect and thus can block the conversion process from frequency doubling light to fundamental frequency light, but they can provide the phase difference between the fundamental frequency light and the frequency doubling light to remedy the insufficient phase mismatch of the nonlinear optical crystal and realize efficient frequency-doubling and sum frequency conversion. The converted laser then enters the prism 10 to separate the light of different wavelengths for easy observation. The prism 10 can separate the pump light 11 and the frequency doubling light 12 which then enter into detector 13 for power or energy detection so as to determine whether the optical frequency conversion has been achieved.

Figure 4:
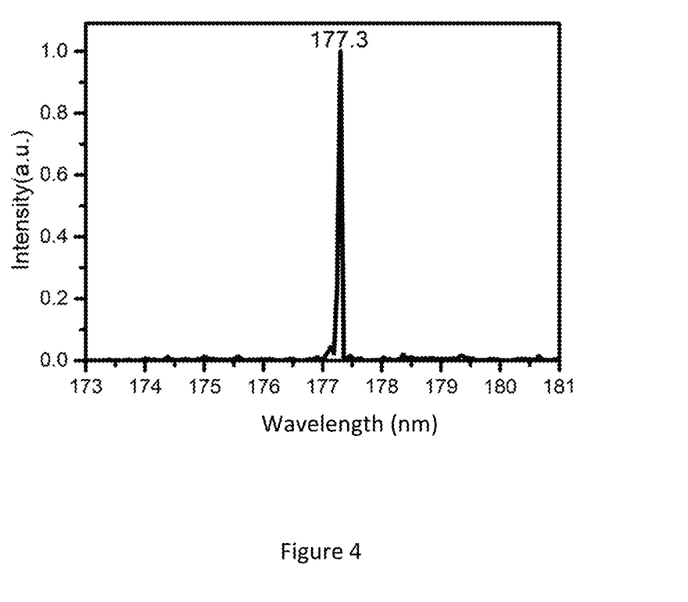
FIG. 4 is the 177.3 nm frequency-doubling laser output spectrum at wavelength of 355 nm in Embodiment 1 with wavelength (nm) as the x-coordinate and relative intensity as the y-coordinate.

The pump power can be increased to realize 177.3 nm deep ultraviolet laser output with output wavelength as shown in FIG. 4.

Figure 5:
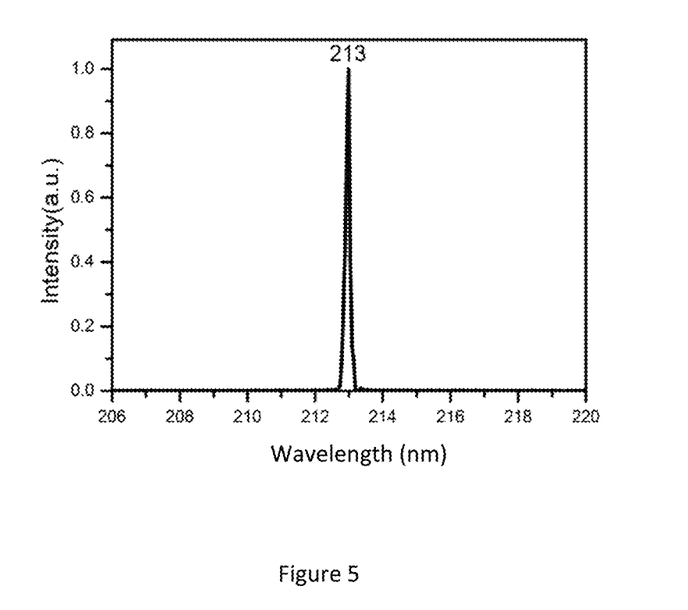
FIG. 5 is the 213 nm frequency-doubling laser output spectrum at wavelength of 426 nm in Embodiment 2 with wavelength (nm) as the x-coordinate and relative intensity as the y-coordinate.

Embodiment 2: Quartz Crystal 213 nm-Wavelength Ultraviolet Frequency-Doubling Converter As described in Embodiment 1, provided that the pump source 7 is a pulsed laser with a wavelength of 426 nm, a pulse width of 10 ns and a repetition frequency of 50 Hz; the quartz crystal is with a cross section of 5 mm×3 mm, and the width of the processed and the unprocessed region is both 1.4 μm in each period; the processed region can provide a phase difference of π between the fundamental frequency light and the frequency doubling light; and the pump power can be increased to realize 213 nm ultraviolet wavelength laser output with output wavelength as shown in FIG. 5.

Figure 6:
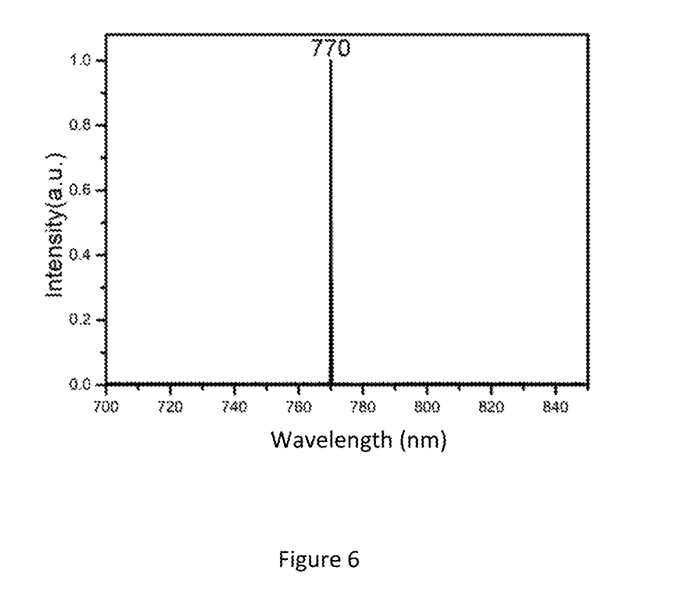
FIG. 6 is the 770 nm frequency-doubling laser output spectrum at wavelength of 1540 nm in Embodiment 3 with wavelength (nm) as the x-coordinate and relative intensity as the y-coordinate.

Embodiment 3: Quartz Crystal 770 nm Visible Wavelength Frequency-Doubling Converter As described in Embodiment 1, provided that the pump source 7 is a femtosecond pulsed laser with a wavelength of 1540 nm, a pulse width of 500 fs and a repetition frequency of 200 MHz; the quartz crystal is with a cross section of 4×4 mm and a 50 mm length, and is surface coated with dielectric film that allows high transmission of both 1540 nm and 770 nm light; no calcium fluoride prism or glove box is required; a grating structure periodically arranged according to different refractive indexes is formed by ion beam etching in the Z direction, wherein width of the processed region and the unprocessed region is both 34.4 μm in each period; the phase difference realized between the fundamental frequency light and the frequency doubling light is π; and the pump power can be increased to realize 770 nm visible wavelength laser output with output wavelength as shown in FIG. 6.

Embodiment 4: SBO Crystal 177.3 nm Deep Ultraviolet Wavelength Frequency-Doubling Converter As described in Embodiment 1, provided that the nonlinear optical crystal used is a SBO crystal; with the maximum nonlinear coefficient $d_{33}$, the crystal is to be cut in the X direction; the crystal is 10 mm long with a cross section of 3×4 mm; a grating structure periodically arranged according to different refractive indexes is then formed by laser etching in the X direction, wherein width of the processed region and the unprocessed region is both 2.9 μm in each period; the processed region can provide a phase difference of 5π between the fundamental frequency light and the frequency doubling light; and the pump power can be increased to realize 177.3 nm deep ultraviolet wavelength laser output.

Embodiment 5: LBO Crystal 355 nm Ultraviolet Wavelength Sum Frequency Converter

Figure 7:
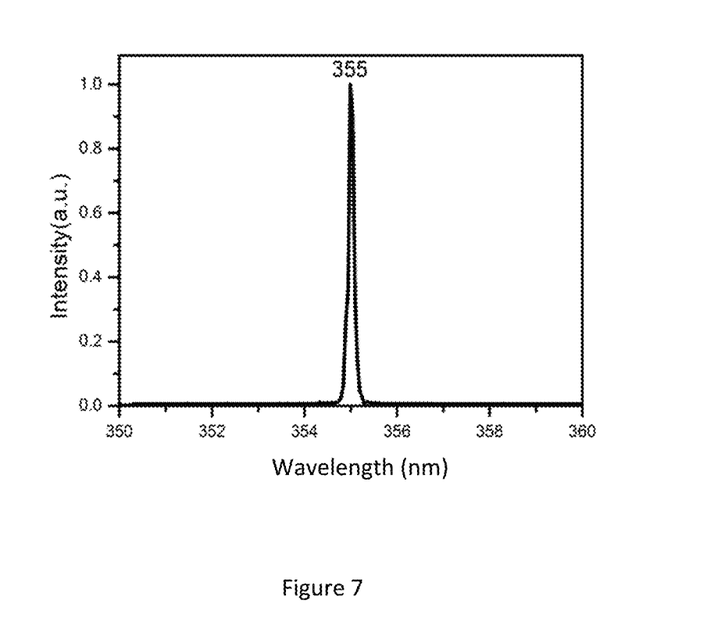
FIG. 7 is the 355 nm sum-frequency laser output spectrum at wavelength of 1064 nm and 532 nm in Embodiment 5 with wavelength (nm) as the x-coordinate and relative intensity as the y-coordinate.

As described in Embodiment 1, provided that the nonlinear optical crystal used is a LBO crystal which can produce 355 nm laser light through the sum frequency of coaxial lasers with wavelengths of 1064 nm and 532 nm; with the maximum nonlinear coefficient $d_{32}$, the crystal is to be cut in the X direction; the crystal is 20 mm long with a cross section of 5×5 mm; a grating structure periodically arranged according to different refractive indexes is then formed by laser etching in the X direction, wherein width of the processed region and the unprocessed region is both 4.4 μm in each period; the processed region can provide a phase difference of π between the fundamental frequency light and the sum frequency light; and the pump power can be increased to realize 355 nm ultraviolet wavelength laser output with output wavelength as shown in FIG. 7.

Embodiment 6: KBBF Crystal 205 nm Ultraviolet Wavelength Frequency-Doubling Converter As described in Embodiment 1, provided that the nonlinear optical crystal used is a KBBF crystal; with the maximum nonlinear coefficient $d_{11}$, the crystal is to be cut in the Z direction; the crystal is 2.5 mm long with a cross section of 2×3 mm; a grating structure periodically arranged according to different refractive indexes is then formed by laser etching in the Z direction, wherein width of the processed region and the unprocessed region is both 1.6 μm in each period; the processed region can provide a phase difference of π between the fundamental frequency light and the frequency doubling light; the pump source 7 is an optical parametric oscillator with a wavelength of 410 nm, a pulse width of 20 ns and a repetition frequency of 20 Hz; and the pump power can be increased to realize 205 nm ultraviolet wavelength laser output.

Figure 8:
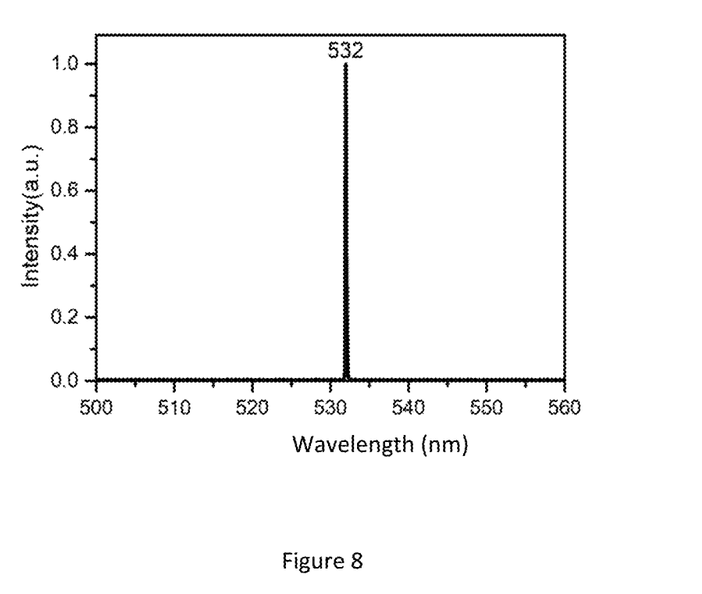
FIG. 8 is the 532 nm frequency-doubling laser output spectrum at wavelength of 1064 nm in Embodiment 7 with wavelength (nm) as the x-coordinate and relative intensity as the y-coordinate.

Embodiment 7: LiNbO$_3$ Crystal 532 nm Visible Wavelength Frequency-Doubling Converter As described in Embodiment 1, provided that the nonlinear optical crystal is a LiNbO$_3$ crystal; with the maximum nonlinear coefficient d$_{33}$, the crystal is to be cut in the X direction; the pump source 7 is a continuous laser with a wavelength of 1064 nm; the crystal is with a circular cross section, a 20 mm length and a 10 mm diameter, and is surface coated with dielectric film that allows high transmission of both 1064 nm and 532 nm light; no calcium fluoride prism or glove box is required; a grating structure periodically arranged according to different refractive indexes is formed by ion beam etching in the X direction, wherein, in each period, the width of the processed region is 3.5 µm and that of the unprocessed region is 10.5 µm; the processed region can realize a phase difference of π between the fundamental frequency light and the frequency doubling light, while the unprocessed region can realize a phase difference of 3π between the fundamental frequency light and the frequency doubling light; and the pump power can be increased to realize 532 nm visible wavelength laser output with output wavelength as shown in FIG. 8.

Embodiment 8: MgBaF$_4$ Crystal 266 nm Ultraviolet Wavelength Frequency-Doubling Converter As described in Embodiment 1, provided that the nonlinear optical crystal is a MgBaF$_4$ crystal; with the maximum nonlinear coefficient d$_{32}$, the crystal is to be cut in the X direction; the pump source 7 is a pulsed laser with a wavelength of 532 nm, a pulse width of 50 ns and a repetition frequency of 1 kHz; the crystal is with a cross section of 6×6 mm and a 30 mm length; a grating structure periodically arranged according to different refractive indexes is formed by laser etching in the X direction, wherein width of the processed region and the unprocessed region is both 10.7 µm in each period; the processed region can realize a phase difference of 3π between the fundamental frequency light and the frequency doubling light; and the pump power can be increased to realize 266 nm ultraviolet wavelength laser output.

Figure 9:
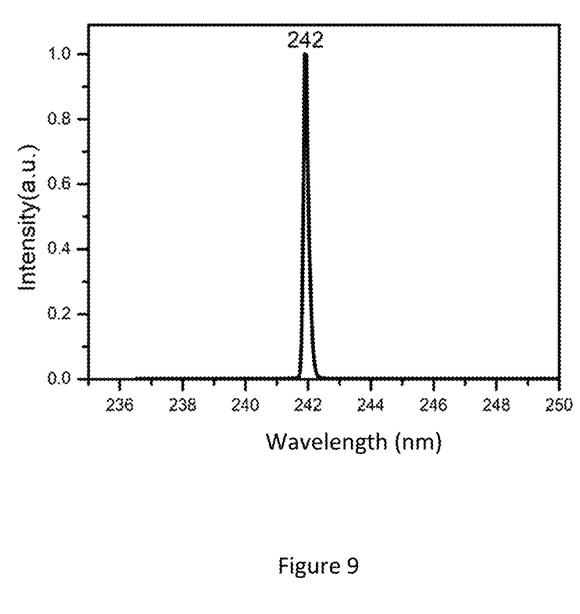
FIG. 9 is the 242 nm frequency-doubling laser output spectrum at wavelength of 484 nm in Embodiment 9 with wavelength (nm) as the x-coordinate and relative intensity as the y-coordinate.

Embodiment 9: β-BBO Crystal 242 nm Ultraviolet Wavelength Frequency-Doubling Converter As described in Embodiment 1, provided that the nonlinear optical crystal used is a β-BBO crystal; with the maximum nonlinear coefficient d$_{22}$, the crystal is to be cut in the Z direction; the crystal is 15 mm long with a cross section of 3×4 mm; a grating structure periodically arranged according to different refractive indexes is then formed by laser etching in the Z direction, wherein width of the processed region and the unprocessed region is both 3.3 µm in each period; the processed region can provide a phase difference of 3π between the fundamental frequency light and the frequency doubling light; the pump source 7 is a pulsed laser with a wavelength of 484 nm a pulse width of 10 ns and a repetition frequency of 100 Hz; and the pump power can be increased to realize 242 nm ultraviolet wavelength laser output with output wavelength as shown in FIG. 9.

Furthermore, as can be seen from the above embodiments, the invention provides a visible-to-ultraviolet band optical frequency converter by controlling the phase difference between the fundamental frequency light and the frequency doubling light, which can realize visible—ultraviolet—deep ultraviolet frequency-doubling or sum frequency laser output, and in particular, provides a new variety for the scarce UV and deep UV crystal devices.

What is claimed is:

1. A visible-to-ultraviolet band optical frequency converter, wherein the optical frequency converter comprises: a non-linear optical crystal that converts a fundamental-frequency light to a frequency-doubled light, and amorphous regions distributed at regular intervals are formed inside the optical crystal; the amorphous regions provide a phase difference between the fundamental-frequency light and the frequency-doubled light; wherein the phase difference between the fundamental-frequency light and the frequency-doubled light provided by the amorphous regions is $\Delta\varphi_b=(2m+1)\pi$, where m is an integer, which depletes coherent superposition of non-linear optical effects and conversion of the fundamental-frequency light to the frequency-doubled light.

2. The visible-to-ultraviolet band optical frequency converter according to claim 1, wherein the amorphous regions distributed at regular intervals are phase gratings with periodic refractive indexes perpendicular to the direction of light transmission, the phase gratings are arranged in parallel along the direction of light transmission of the crystal, and the phase differences of transmission in a processed region and an unprocessed region in a grating period are both $\Delta\varphi=(2m+1)\pi$, where m is an integer;

the phase gratings are formed by processing the crystal and arranged periodically inside the crystal with different refractive indexes, and the period of the gratings is $\Lambda=l_c+l_b$, where $l_c$ is width of an unprocessed portion in the direction of light transmission of the crystal within one period, and $l_b$ is width of a processed portion in the direction of light transmission of the crystal.

3. The visible-to-ultraviolet band optical frequency converter according to claim 2, wherein the crystal processing method is laser micro-processing or ion etching.

4. The visible-to-ultraviolet band optical frequency converter according to claim 2, wherein the width of the unprocessed portion is $l_c$=0.1-50 µm, and the width of the processed portion is $l_b$=0.1-50 µm.

5. The visible-to-ultraviolet band optical frequency converter according to claim 1, wherein the non-linear optical crystal is selected from a group consisting of quartz crystal, lithium triborate crystal, barium metaborate crystal, strontium tetraborate crystal, lithium niobate crystal, potassium fluoroborate beryllium crystal, potassium dihydrogen phosphate crystal, and barium magnesium fluoride crystal.

6. The visible-to-ultraviolet band optical frequency converter according to claim 1, wherein the non-linear optical crystal transmits both fundamental frequency light and frequency-doubled light.

7. The visible-to-ultraviolet band optical frequency converter according to claim 6, wherein surface of the non-linear optical crystal is coated with a dielectric film.

8. The visible-to-ultraviolet band optical frequency converter according to claim 1, wherein length of the non-linear optical crystal in the direction of light transmission is 0.1-100 mm.

9. The visible-to-ultraviolet band optical frequency converter according to claim 8, wherein the length of the non-linear optical crystal in the direction of light transmission is 3-10 mm.

10. The visible-to-ultraviolet band optical frequency converter according to claim 1, wherein cross section of the non-linear optical crystal is circular or square in shape.

* * * * *